(12) United States Patent
Shirakawa

(10) Patent No.: US 6,952,920 B2
(45) Date of Patent: Oct. 11, 2005

(54) EXHAUST GAS CLEANING SYSTEM

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 8 days.

(21) Appl. No.: 10/886,659

(22) Filed: Jul. 9, 2004

(65) Prior Publication Data

US 2005/0022519 A1 Feb. 3, 2005

(30) Foreign Application Priority Data

Jul. 31, 2003 (JP) ........................................ 2003-284230

(51) Int. Cl.[7] .............................................. F01N 3/02
(52) U.S. Cl. .............................. 60/311; 60/274; 60/295
(58) Field of Search .......................... 60/295, 297, 311, 60/274

(56) References Cited

U.S. PATENT DOCUMENTS

| | | | | |
|---|---|---|---|---|
| 4,603,550 A | * | 8/1986 | Shinzawa | 60/274 |
| 6,405,528 B1 | * | 6/2002 | Christen et al. | 60/295 |
| 2002/0196153 A1 | | 12/2002 | Kinugawa et al. | |

FOREIGN PATENT DOCUMENTS

| | | |
|---|---|---|
| EP | 1081347 A | 3/2001 |
| JP | 60-047937 A | 7/1985 |
| JP | 6-341312 A | 12/1994 |

* cited by examiner

Primary Examiner—Thomas Denion
Assistant Examiner—Diem Tran
(74) Attorney, Agent, or Firm—Shinjyu Global IP Counselors, LLP.

(57) ABSTRACT

An exhaust gas cleaning system is provided that includes a particulate filter in an exhaust passage. The exhaust gas cleaning system is configured and arranged to determine an accumulation state of particulate matter in a particulate filter by obtaining a reference equivalent surface area of a passage inside the particulate filter based on a pressure difference between before and after the particulate filter, an exhaust gas flow rate, and a temperature of the exhaust gas passing through the particulate filter. The exhaust gas cleaning system is configured and arranged to obtain an adjusted equivalent surface area by adjusting the reference equivalent surface area based on a temperature of the particulate filter and the exhaust gas flow rate. Thus, an amount of particulate matter accumulated in a particulate filter of a diesel engine is accurately estimated without the estimation result being erroneously affected by the engine operating conditions.

11 Claims, 6 Drawing Sheets

EXHAUST GAS CLEANING SYSTEM

BACKGROUND OF THE INVENTION

1. Field of the Invention

The present invention relates to an exhaust gas cleaning system for an internal combustion engine, such as a diesel engine, that uses a particulate filter to collect and remove particulate matter in an exhaust gas discharged from the engine. More specifically, the present invention relates to a method of determining a particulate matter accumulation state of the particulate filter.

2. Background Information

Harmful exhaust components such as carbon particles and other particulate matters (particulate matter or "PM") contained in an exhaust gas have become an enormous problem especially in diesel engines. Conventionally, various types of particulate matter capturing filters (Diesel Particulate Filter or "DPF") have been used as exhaust gas after-treatment devices to collect and remove the particulate matter contained in the exhaust gas.

When this type of particulate filter is used, the particulate filter needs to be regenerated when an amount of accumulated particulate matter reaches a prescribed amount by combusting the particulate matter accumulated in the particulate filter. Therefore, it is necessary to determine or estimate an amount or degree of the particulate matter accumulated in the particulate filter.

Some of the conventional methods are configured to estimate the amount of particulate matter accumulated in the particulate filter by utilizing a phenomenon that the pressure loss of the particulate filter increases as an amount of particulate matter accumulated in the particulate filter increases.

For example, Japanese Laid-Open Patent Publication No. 6-341312 describes a technology in which pressure sensors are arranged on the upstream side and downstream side of a particulate filter installed in an exhaust passage of the engine. The sensors are arranged to detect the pressure difference between before and after the particulate filter, i.e., the pressure loss resulting from the exhaust gas passing through the particulate filter. Additionally, in the above mentioned reference, the detected pressure difference is corrected based on the exhaust gas temperature and the engine rotational speed to obtain a corrected pressure loss. The corrected pressure loss is used to determine a particulate matter accumulation amount in the particulate filter.

In view of the above, it will be apparent to those skilled in the art from this disclosure that there exists a need for an improved exhaust gas cleaning system. This invention addresses this need in the art as well as other needs, which will become apparent to those skilled in the art from this disclosure.

SUMMARY OF THE INVENTION

A simplest method of estimating a particulate matter accumulation amount is to determine the particulate matter accumulation amount is high enough such that the particulate filter is needed to be regenerated when the pressure difference between before and after the particulate filter reaches a certain prescribed value. However, as shown in FIG. 8, a relationship between the pressure difference and the particulate matter accumulation amount changes greatly depending on the engine operating conditions. Therefore, the precision of the estimation in the above explained method is extremely low.

According to the Bernoulli theorem, when a fluid flows through a constricted portion of a passage, a surface area A of the passage, flow rate Q, a pressure difference $\Delta P$ between before and after the constricted portion, and a fluid density $\rho$ have the following relationship.

$$A = Q/\sqrt{(2\rho\Delta P)}$$

The conventional estimating method described in the above mentioned reference is designed to correct the estimation based on the exhaust gas temperature and the engine rotational speed in order to approximate the relationship expressed by the above equation. However, even if the equivalent surface area (theoretical surface area) is calculated accurately based on the above equation, the relationship between the equivalent surface area and the particulate matter accumulation amount changes depending on the operating conditions. In other words, even if the equivalent surface area is calculated accurately according to the above equation, the precision of the estimation of the particulate matter accumulation amount will be low.

It has been discovered that one cause of the error between the theoretical value and the actual value of the particulate matter accumulation amount is a change in a passage usage efficiency of the passages in the particulate filter. More specifically, the passage usage efficiency of the fine (very narrow) passages of the particulate filter, e.g., a wall flow honeycomb filter, increases as the exhaust gas pressure increases. A second cause is believed to be that the bulk density of the particulate filter increases as the temperature of the filter increases, and thus, the surface areas of the fine (very narrow) passages of the particulate filter become physically smaller.

Therefore, one of the objects of the present invention is to provide the exhaust gas cleaning system that corrects a reference value of the equivalent surface area based on the exhaust gas pressure (i.e., exhaust gas flow speed) and the temperature of the particulate filter. The reference value of the equivalent surface are is calculated theoretically using the engine operating condition such as exhaust gas flow speed, etc.

In order to achieve the above mentioned and other objects of the present invention, an exhaust gas cleaning system is provided that comprises a particulate filter, a pressure difference detecting section, an exhaust gas flow rate determining section, an exhaust gas temperature detecting section, and an accumulating state determining section. The particulate filter is disposed in an exhaust passage of an engine and configured and arranged to accumulate particulate matter in an exhaust gas discharged from the engine. The pressure difference detecting section is configured and arranged to detect a pressure difference in the exhaust passage between before and after the particulate filter. The exhaust gas flow rate determining section is configured and arranged to determine an exhaust gas flow rate. The exhaust gas temperature detecting section is configured and arranged to detect a temperature of the exhaust gas passing through the particulate filter. The accumulation state determining section is configured and arranged to determine an accumulation state of the particulate matter in the particulate filter by obtaining a reference equivalent surface area of a passage inside the particulate filter based on the pressure difference detected in the pressure difference detecting section, the exhaust gas flow rate determined in the exhaust gas flow rate determining section, and the temperature of the exhaust gas detected in the exhaust gas temperature detecting section. The accumulation state determining section is further configured to obtain an adjusted equivalent surface area by adjusting the reference equivalent surface area based on a temperature of the particulate filter and the exhaust gas flow rate.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
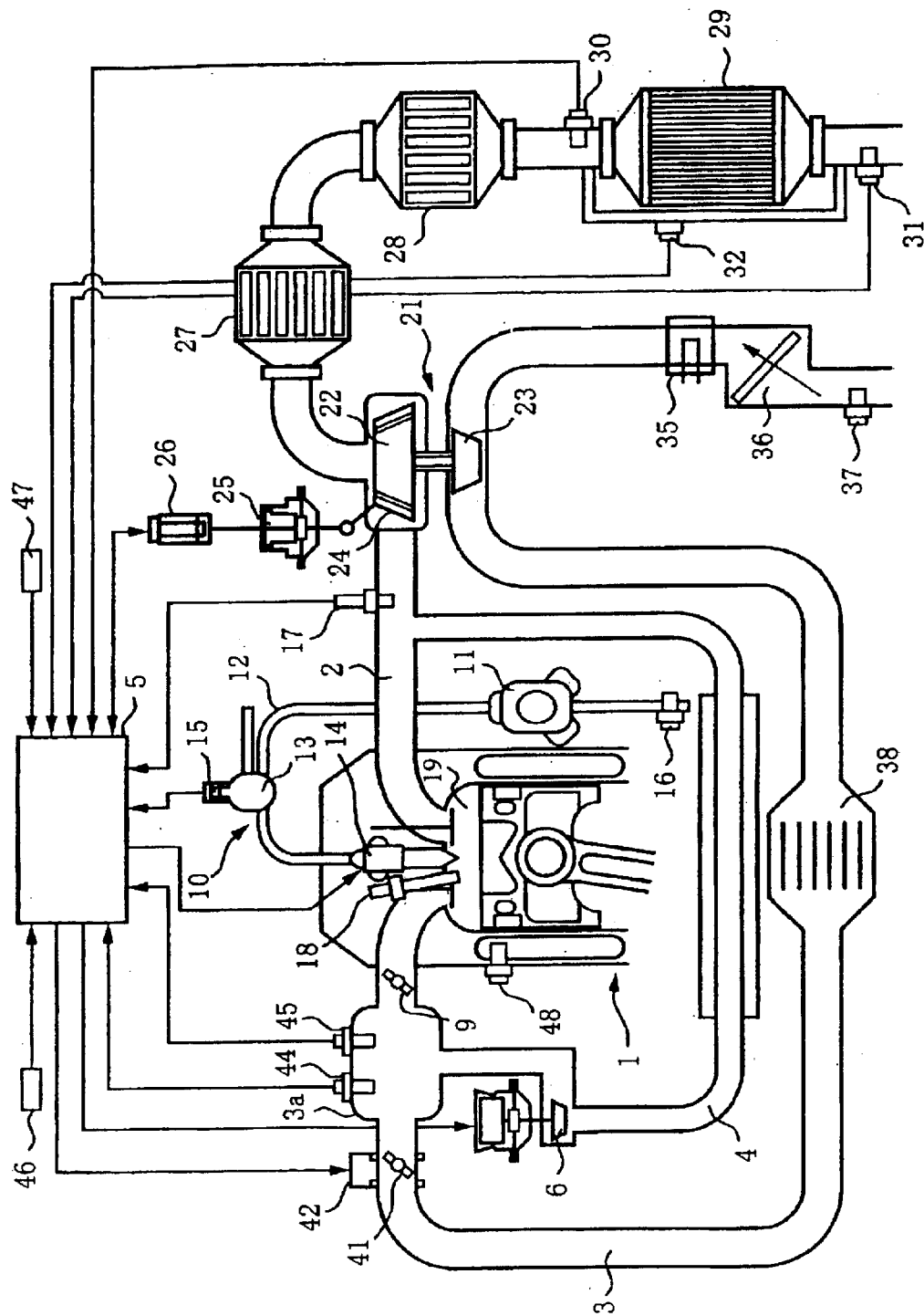
FIG. 1 is a diagrammatic view of a diesel engine equipped with an exhaust gas cleaning system in accordance with one embodiment of the present invention.

Referring initially to FIG. 1, an exhaust gas cleaning system is illustrated for an internal combustion engine such as a turbocharged diesel engine 1 in accordance with a first embodiment of the present invention. The exhaust gas cleaning system in accordance with the present invention can be applied to other internal combustion engines used in automobiles and the like. The engine 1 preferably performs a comparatively large quantity of exhaust gas recirculation (EGR). With the present invention, even when the engine operating conditions change, the adjusted equivalent surface area that substantially corresponds to the particulate matter accumulation amount can be obtained, and thus, the accumulation state of the particulate matter can be estimated with good precision. As a result, the regeneration of the particulate filter can be executed at an appropriate timing.

As seen in FIG. 1, the engine 1 has an exhaust passage 2 and an intake passage 3 with a collector 3a. An EGR passage 4 links the exhaust passage 2 to the collector 3a of the air intake passage 3. The operation of the engine 1 is controlled by an engine control unit 5. More specifically, the control unit 5 preferably includes a microcomputer with a control program that controls the engine 1 as discussed below. The control unit 5 can also include other conventional components such as an input interface circuit, an output interface circuit, and storage devices such as a ROM (Read Only Memory) device and a RAM (Random Access Memory) device. The microcomputer of the control unit 5 is programmed to control the various components of the engine 1. The memory circuit stores processing results and control programs that are run by the processor circuit. The control unit 5 is operatively coupled to the various components of the engine 1 in a conventional manner. The internal RAM of the control unit 5 stores statuses of operational flags and various control data. The control unit 5 is capable of selectively controlling any of the components of the control system in accordance with the control program. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

An EGR valve 6 is disposed in the EGR passage 4 and is operatively connected to the engine control unit 5. Preferably, the valve opening degree of the EGR valve 6 can be continuously and variably controlled by a stepping motor or any other device that can continuously and variably control the valve opening degree of the EGR valve 6. The valve opening degree of the EGR valve 6 is controlled by the engine control unit 5 to obtain a specified EGR rate in response to the operating conditions received by the engine control unit 5 from various operating condition sensors. In other words, the valve opening degree of the EGR valve 6 is variably controlled so as to variably control the EGR rate towards a target EGR rate set by the engine control unit 5. For example, the EGR rate is set to a large EGR rate when the engine 1 is operating in a low-speed, low-load region, and as the engine speed and load becomes higher, the EGR rate becomes lower.

A swirl control valve 9 is provided in the intake passage 3 in the vicinity of an air intake port of the engine 1. The swirl control valve 9 is configured and arranged to produce a swirling flow inside the combustion chamber 19 depending on the operating conditions of the engine 1. The swirl control valve 9 is driven by an actuator (not shown) and opened and closed in response to a control signal from the control unit 5. For example, the swirl control valve 9 is preferably closed in a low load and low speed condition to produce a swirling flow inside the combustion chamber 19.

The engine 1 is also preferably equipped with a common rail fuel injection device 10. In this common rail fuel injection device 10, after fuel is pressurized by a high pressure fuel pump 11, the fuel is fed through a high-pressure fuel supply passageway 12 such that the fuel accumulates in an accumulator 13 (common rail). The fuel is then distributed from this accumulator 13 to a plurality of fuel injection nozzles 14 for each of the engine cylinders. The control unit 5 is configured to control the opening and closing of the nozzles of each of the fuel injection nozzles 14 to inject fuel into the engine cylinders. The fuel pressure inside the accumulator 13 is variably adjusted by a pressure regulator (not shown) and a fuel pressure sensor 15 is provided in the accumulator 13 for detecting the fuel pressure. The fuel pressure sensor 15 is configured and arranged to output to the control unit 5 a fuel pressure signal that is indicative of the fuel pressure in the accumulator 13.

A fuel temperature sensor 16 is arranged upstream of the fuel pump 11. The fuel temperature sensor 16 is configured and arranged to detect the fuel temperature and output to the control unit 5 a signal that is indicative of the fuel temperature. In addition, a conventional glow plug 18 is arranged in the combustion chamber 19 of each of the engine cylinders to ignite the fuel in each combustion chamber 19.

The engine 1 has a variable-capacity turbo supercharger 21 equipped with a coaxially arranged exhaust turbine 22 and a compressor 23. For example, a variable geometric turbocharger having a variable geometric valve system can be used as the variable-capacity turbo charger 21. Of course, it will be apparent to those skilled in the art from this disclosure that the variable-capacity turbo supercharger 21 is not limited to the variable geometric turbocharger. Rather, any type of turbo supercharger in which a capacity of the turbo supercharger is effectively varied by controlling a capacity adjusting device or devices can be utilized as the variable-capacity turbo supercharger 21 in the present invention. The exhaust turbine 22 is positioned in the exhaust passage 2 at a position downstream of a portion where the EGR passage 4 connects to the exhaust passage 2. In order to vary a capacity of the turbo supercharger 21, the turbo supercharger 21 is preferably provided with a variable nozzle 24 or a capacity adjusting device arranged at a scroll inlet of the exhaust turbine 22. In other words, a capacity of the turbo supercharger 21 can be varied depending on the engine operating conditions. For example, a relatively small capacity of the turbo supercharger 21 is preferably achieved by reducing an opening degree of the variable nozzle 24 when the exhaust gas flow rate is relatively small (such as a low speed region). On the other hand, a relatively large capacity is preferably achieved by increasing the opening degree of the variable nozzle 24 when the exhaust gas flow rate is relatively large (such as a high speed region). The variable nozzle 24 is preferably driven by a diaphragm actuator 25 configured to respond to a control pressure (negative control pressure), and the control pressure is generated using a duty-controlled pressure control valve 26. A wide-range air fuel ratio sensor 17 is provided on the upstream side of the exhaust turbine 22. The air-fuel ratio sensor 1 7is configured and arranged to detect the air fuel ratio of the exhaust gas. Thus, the air-fuel ratio sensor 17 is further configured and arranged to output to the control unit 5 a signal that is indicative of the exhaust air-fuel ratio.

The exhaust system of the engine 1 includes an oxidation catalytic converter 27 disposed in the exhaust passage 2 on the downstream side of the exhaust turbine 22. The oxidation catalytic converter 27 has an oxidation catalyst that oxidizes, for example, CO and HC contained in the exhaust gas. The exhaust system of the engine 1 also includes a NOx trapping catalytic converter 28 that is configured to treat NOx in the exhaust passage 2 on the downstream side of the oxidation catalytic converter 27. Thus, the oxidation catalytic converter 27 and the NOx trapping catalytic converter 28 are arranged in sequence in the exhaust passage 2 downstream of the exhaust gas turbine 22. This NOx trapping catalytic converter 28 is configured and arranged to adsorb NOx when the exhaust air-fuel ratio of the exhaust flowing into the NOx trapping catalytic converter 28 is lean. Thus, the oxygen density of the exhaust flowing into the NOx trapping catalytic converter 28 drops. When an oxygen concentration of the exhaust gas decreases, the NOx trapping catalytic converter 28 releases the adsorbed NOx and cleans the exhaust gas by catalytic action so as to perform a purification process.

The exhaust system of the engine 1 also includes an exhaust gas after-treatment system such as a particulate filter 29 (diesel particulate filter: DPF) that is equipped with a catalyst for collecting and removing exhaust particulate matter (particulate matter or "PM"). The particulate filter 29 is provided on the downstream side of the NOx trapping catalytic converter 28. The particulate filter 29 is constructed, for example, with a wall flow honeycomb structure (alternate cannel end blocked type) having a solid-cylindrical filter material such as cordierite with a plurality of honeycomb-shaped, fine passages formed therein and the alternate ends of the passages are closed. The alternate cannel end blocked type particulate filter is conventional component that are well known in the art. Since this type of the particulate filters is well known in the art, these structures will not be discussed or illustrated in detail herein.

The exhaust system of the engine 1 also includes a filter inlet temperature sensor 30 and a filter outlet temperature sensor 31 that are provided on the inlet side and outlet side of the particulate collection filter 29, respectively. The temperature sensors 30 and 31 are configured and arranged to detect the exhaust temperature at the inlet side and outlet side, respectively. Thus, the temperature sensors 30 and 31 are further configured and arranged to output to the control unit 5 a signal that is indicative of the exhaust temperature at the inlet side and outlet side, respectively.

Since a pressure loss of the particulate filter 29 changes as the exhaust particulate matter accumulates, a pressure difference sensor 32 is provided to detect the pressure difference between the inlet and outlet of the particulate collection filter 29. Of course, it will be apparent to those skilled in the art from this disclosure that, instead of using the pressure difference sensor 32 to detect the pressure difference directly, separate pressure sensors can be provided at the inlet and the outlet of the particulate filter 29 to find the pressure difference based on the two pressure values. A muffler (not shown) is also preferably disposed downstream of the particulate collection filter 29.

The intake air system of the engine 1 preferably includes an airflow meter 35 that is configured and arranged to detect a fresh intake air quantity passing through the air intake passage 3. The airflow meter 35 is provided on the upstream side of the compressor 23 in the air intake passage 3. The airflow meter 35 is configured and arranged to output to the control unit 5 a signal that is indicative of the fresh intake air quantity passing through the air intake passage 3.

The intake air system of the engine 1 preferably includes an air filter 36 and an atmospheric pressure sensor 37 that are positioned on the upstream side of the airflow meter 35. The atmospheric pressure sensor 37 configured and arranged to detect outside pressure, i.e., atmospheric pressure. The atmospheric pressure sensor 37 is provided at the inlet of the air filter 36. The atmospheric pressure sensor 37 is configured and arranged to output to the control unit 5 a signal that is indicative of the outside air pressure entering the air intake passage 3.

The intake air system of the engine 1 preferably includes an intercooler 38 to cool the high-temperature supercharged air. The intercooler 38 is disposed in the air intake passage 3 between the compressor 23 and a collector 3a.

In addition, the intake air system of the engine 1 preferably includes an intake air throttle valve 41 that is configured to restrict the fresh intake air quantity. The intake air throttle valve 41 is installed in the air intake passage 3 on the inlet side of the collector 3a of the air intake passage 3. The opening and closing of this intake air throttle valve 41 is driven by control signals of the engine control unit 5 through an actuator 42 that preferably includes a stepper motor or the like. Further, a supercharging pressure sensor 44 that detects supercharging pressure and an intake temperature sensor 45 that detects intake air temperature are provided in the collector 3a.

The control unit 5 is configured and arranged to control a fuel injection quantity and a fuel injection timing of the fuel injection device 10, the opening degree of the EGR valve 6, the opening degree of the variable nozzle 24, and other components and functions of the engine 1. Moreover, in addition to the various sensors installed in the engine 1 as mentioned above, the control unit 5 is configured and arranged to receive detection signals from an accelerator position sensor 46 for detecting a depression amount of the accelerator pedal, an engine rotational speed sensor 47 for detecting the rotational speed of the engine, and a temperature sensor 48 for detecting the temperature of the engine coolant.

The control operations executed by the control unit 5 will now be described with reference to the functional block diagrams of FIGS. 2 and 3, and 8 to 10. Many of the functions described below are functions that can be executed using software processing. First, the processing for determining an amount of exhaust particulate matter accumulated in the particulate filter 29 is explained with reference to FIGS. 2 and 3.

Basically, in the exhaust gas cleaning system of the present invention, a particulate matter accumulation amount corresponding to an amount of the particulate matter accumulated in the particulate filter 29 is estimated by first calculating a passage surface area (an equivalent surface area) of the particulate filter 29 based on the Bernoulli theorem. Then, the calculated passage surface area is compared with a surface area corresponding to a case in which the accumulation amount of the exhaust particulate matter in the particulate filter 29 is zero to determine a surface area reduction ratio. Finally, the particulate matter accumulation amount in the particulate filter 29 is calculated based on the surface area reduction ratio. According to the Bernoulli theorem, when a fluid flows through a constricted portion, a surface area A of the constricted portion, a flow rate Q, a pressure difference $\Delta P$ between before and after the constricted portion, and a fluid density $\rho$ have the following relationship.

$$A = Q/\sqrt{(2\rho\Delta P)} \quad (1)$$

Thus, the processing executed in the control unit 5 described below uses the Equation (1) to calculate the equivalent surface area A of the particulate filter 29 at a particular point in time when the calculation is made.

Figure 2:
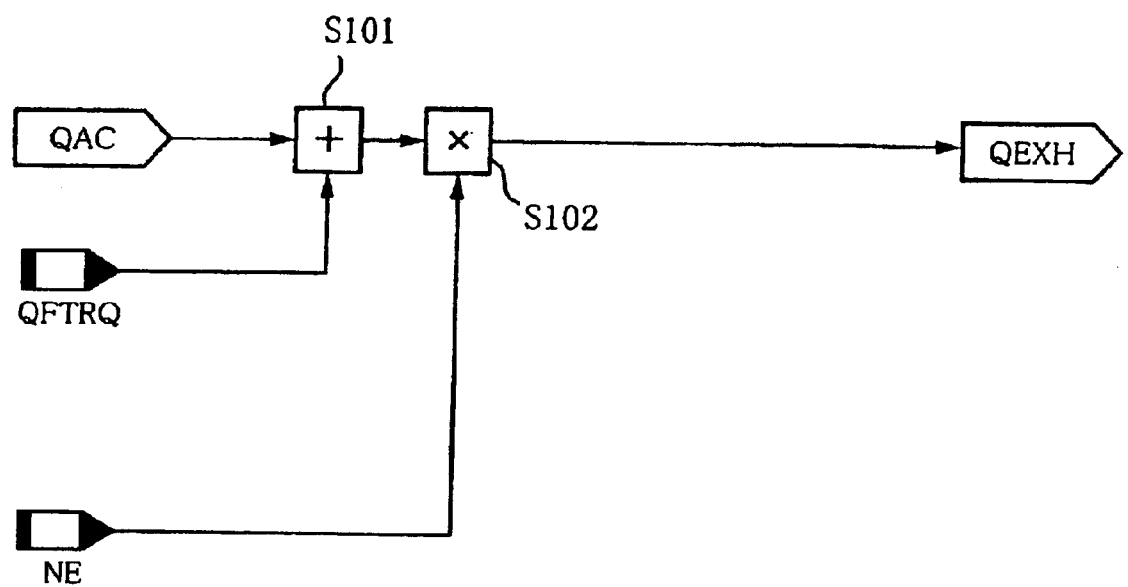
FIG. 2 is a functional block diagram illustrating a control processing executed by the exhaust gas cleaning system in accordance with the one embodiment of the present invention in order to determine an exhaust gas flow rate.

FIG. 2 is a functional block diagram for illustrating a flow of the processing for determining an exhaust gas flow rate QEXH. First, in step S101, a fresh air quantity QAC that flows into the cylinder and a fuel quantity QFTRQ that is injected into the cylinder are added together. Then, in step S102, the resulting sum is multiplied by the engine rotational speed NE to obtain the exhaust gas flow rate QEXH.

Figure 3:
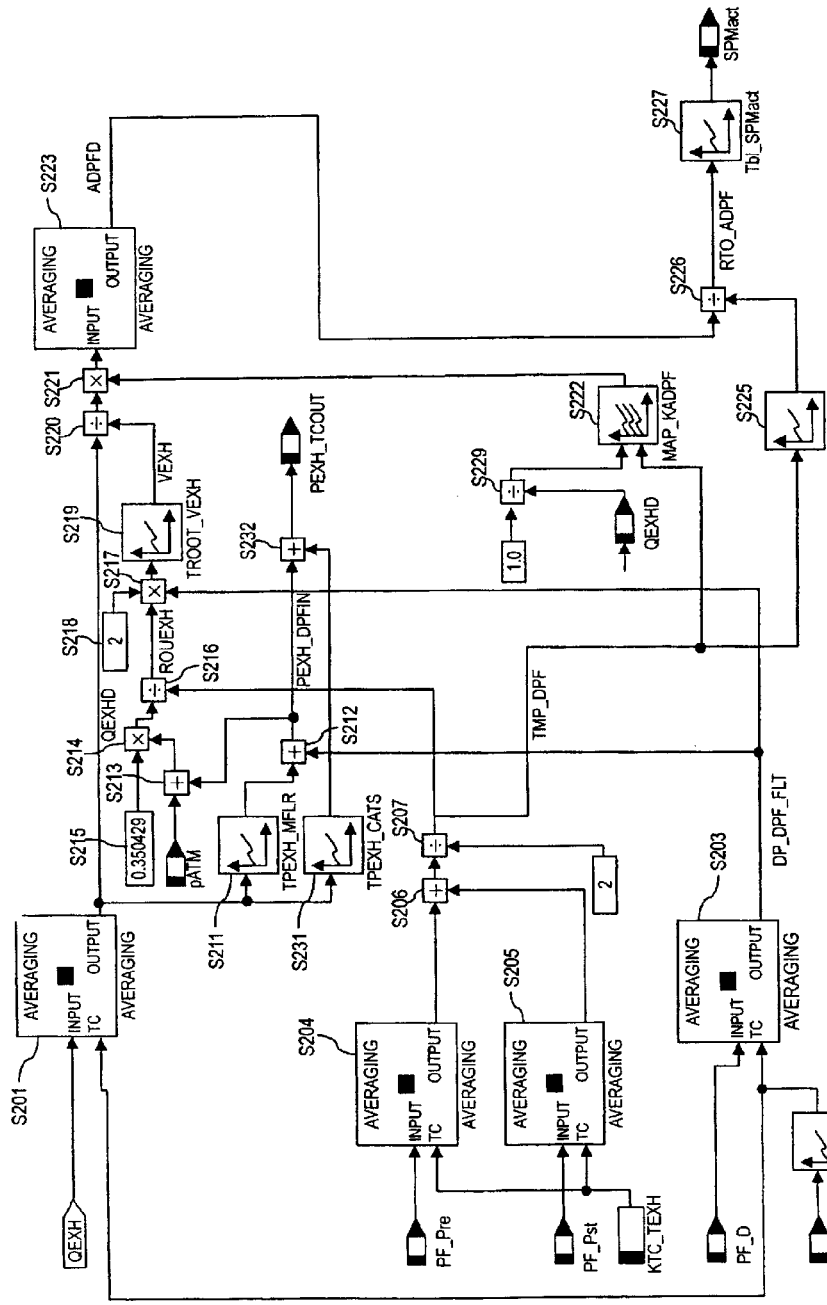
FIG. 3 is a functional block diagram illustrating a control processing executed by the exhaust gas cleaning system in accordance with the one embodiment of the present invention in order to determine a particulate matter accumulation amount.
Figure 4:
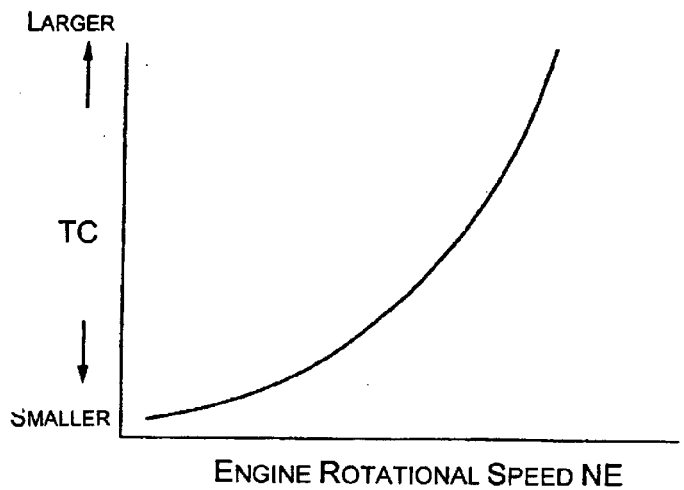
FIG. 4 is a characteristic diagram illustrating characteristics of a map TTC_DPFLT used in step S202 in the functional block diagram of FIG. 3.

FIG. 3 is a functional block diagram for illustrating a flow of the processing for determining a particulate matter accumulation amount SPMact. In step S201 of FIG. 3, the control unit 5 is configured and arranged to compute a weighted average of the consecutive values of the exhaust gas flow rate QEXH that are obtained as explained in FIG. 2. Then, the control unit 5 is configured and arranged to output the result as an exhaust gas flow rate QEXHD having an appropriate response characteristic. The filter constant (weighting coefficient) TC used in the weighted average computation in step S201 is a value found in step S202 using a prescribed map TTC_DPFLT based on the engine rotational speed NE. FIG. 4 illustrates a characteristic of the map TTC_DPFLT in which a response characteristic of the filter constant TC becomes slower when the engine is operating in a low rotational speed region, and faster when the engine is operating in a high rotational speed region.

The filter constant (weighting coefficient) TC determined in step S202 is also used in step S203 to compute a weighted average of consecutive values of an output value PF_D from the pressure difference sensor 32. The result is output as a pressure difference DP_DPF_FLT having an appropriate response characteristic.

In step S204, the control unit 5 is configured and arranged to determine a weighted average of consecutive values of an output value PF_Pre from the filter inlet temperature sensor 30. Also, in step S205, the control unit is configured and arranged to determine a weighted average of consecutive values of an output value PF_Pst from the filter outlet temperature sensor 31. In steps S204 and S205, the filter constant (weighting coefficient) TC used in the weighted average computations is set to a prescribed constant KTC_TEXH instead of using the prescribed map TTC_DPFLT shown in FIG. 4. Then, in step S206, the control unit 5 is configured and arranged to determine a temperature TMP_DPF of the particulate filter 29 as an average value of the inlet and outlet temperatures by adding the weighted average values of the output value PF_Pre and the output value PF-Pst together in step S206 and dividing the sum by a constant 2 in step S207. The temperature TMP_DPF is preferably expressed as an absolute temperature.

When the operating condition of the engine 1 changes abruptly (e.g., when the accelerator pedal depression amount increases or decreases substantially instantaneously), each parameter (i.e., the exhaust gas flow rate QEXH, the temperatures PF_Pre at the inlet and PF_post at the outlet of the particulate filter 29, and the pressure difference PF_D across the particulate filter 29) changes with a different response characteristic. More specifically, the pressure difference PF_Pre and the exhaust gas flow rate QEXH change comparatively quickly but the temperatures PF_Pre and PF_Pst change comparatively slowly. Consequently, there is a transient period during which a large error will be incurred if the particulate matter accumulation amount is estimated by reading in these detection values and using them without any adjustment to these detection values. Additionally, a step response of each parameter to a substantially instantaneous change in the engine operating condition varies depending on whether the engine rotational speed NE is high or low at the time of the change. Therefore, in this embodiment of the present invention, the appropriate filter constant TC is used in the weighted average computation of each detection value to prevent the precision of the particulate matter accumulation amount estimation from declining due to the variation in the response characteristics of the parameters. More particularly, in this embodiment of the present invention, the changes in the temperatures (i.e., PF_Pre and PF_Pst), which have the slower response characteristics than the exhaust gas flow rate QEXH and the pressure difference PF_D, are used as references for adjusting the response characteristics of the exhaust gas flow rate QEXH and the pressure difference PF_D. Also, the filter constant TC used in the weighted average computations of the exhaust gas flow rate QEXH and the pressure difference PF_D changes in accordance with the engine rotational speed NE. In other words, the weighted average computations of the detection values of the exhaust gas flow rate QEXH and the pressure difference PF_D are preferably performed in steps S3 and S5 so that the response characteristics of the exhaust gas flow rate QEXH and the pressure difference PF_D substantially match with the response characteristics of the temperatures PF_Pre and PF_Pst.

In step S211, the control unit 5 is configured and arranged to use a prescribed map TPEXH_MFLR to determine a pressure rise amount by which the pressure rises due to the air flow resistance of the muffler (not shown) based on the exhaust gas flow rate QEXHD. The pressure rise amount generally becomes larger as the exhaust gas flow rate QEXHD increases. In step S212, the control unit 5 is configured and arranged to add the pressure rise amount to the pressure difference DP_DPF_FLT in the exhaust passage 2 between before and after the particulate filter 29 to obtain an output value PEXH_DPFIN. The output value PEXH_DPFIN from step S212 is equivalent to the pressure difference due to the muffler and the particulate filter 29. In step S213, the control unit 5 is configured and arranged to add an atmospheric pressure pATM to the output value PEXH_DPFIN. Thus, the output of step S213 is equivalent to the exhaust gas pressure at the inlet of the particulate filter 29. In step S214, the control unit 5 is configured to multiply the output of step S213 (exhaust gas pressure at the inlet of the particulate filter 29) by a prescribed constant (shown in step S215) that corresponds to the gas constant R (0.350429). In step S216, the control unit 5 is configured and arranged to divide the output of step S214 by the temperature TMP_DPF (absolute temperature) of the particulate filter 29 obtained in steps S204 to S207. As a result, the output of step S216 is equivalent to a density $\rho$, i.e., a specific gravity ROUEXH, of the exhaust gas. In step S217, the control unit 5 is configured and arranged to multiply the specific gravity ROUEXH by a constant 2 (shown in step S218) and by the pressure difference DP_DPF_FLT in accordance with the above explained Equation (1).

In step S219, the control unit 5 is configured and arranged to determine a square root of the output value of step S217. The square root of the output value of step S217 is found using a prescribed map TROOT_VEXH for computational convenience. The result of step S219 is equivalent to the denominator of the expression on the right side of Equation (1), i.e., an exhaust gas flow speed VEXH. In step S220, the control unit 5 is configured and arranged to divide the exhaust gas flow rate QEXH by the exhaust gas flow speed VEXH, thereby obtaining a theoretical value of the surface area A of Equation (1). The theoretical value of the surface area A obtained in step S220 is set to a reference value for the equivalent surface area (reference equivalent surface area) of the particulate filter 29. In this embodiment of the present invention, in order to increase the precision of the estimation of the particulate matter accumulation amount, the control unit 5 is configured and arranged to multiply the reference value of the equivalent surface area (i.e., the output of step S220) by an adjustment coefficient KADPF in step S221. More specifically, the equivalent surface area is adjusted in step S221 based on the exhaust gas flow rate and the temperature of the particulate filter 29 by using the adjustment coefficient KADPF.

Figure 5:
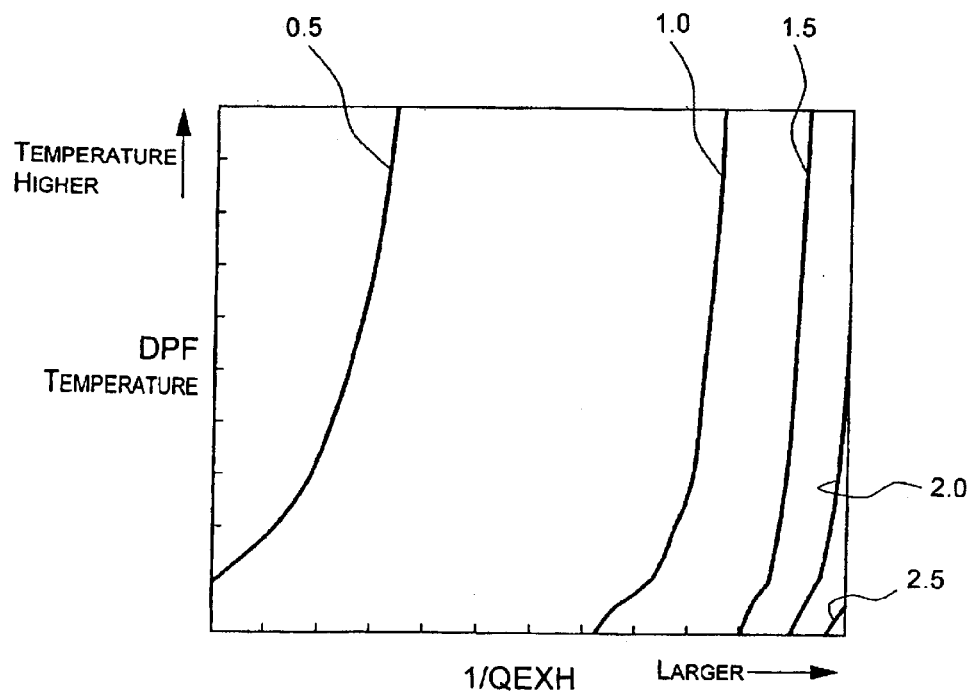
FIG. 5 is a characteristic diagram illustrating characteristics of a map MAP_KADPF used in step S222 in the functional block diagram of FIG. 3.

The adjustment coefficient KADPF is obtained in step S222 using a map MAP_KADPF configured to use an inverse value of the exhaust gas flow rate QEXHD (shown in step S229) and the temperature TMP_DPF of the particulate filter 29 as inputs. FIG. 5 illustrates the characteristic of the map MAP_KADPF. As seen in FIG. 5, the adjustment coefficient KADPF is determined according to the inverse value of the exhaust gas flow rate QEXHD (1/QEXHD), and the adjustment coefficient KADPF varies over a range, for example, from 0.3 to 3.0. In FIG. 5, reference values (0.5, 1.0, 1.5, 2.0 and 2.5) are shown in solid lines, and an interpolated value is calculated based on those two adjacent reference values in an area between the two adjacent reference values. As explained above, the filter passage usage efficiency of the particulate filter 29 changes (increases or decreases) as the exhaust gas flow rate, i.e., exhaust gas pressure, changes. Therefore, the adjustment coefficient KADPF is set to have the characteristic shown in FIG. 5 to counteract the effect of the change in the filter passage usage efficiency of the particulate filter 29. Moreover, the bulk density of the particulate filter 29 increases as the temperature of the particulate filter 29 increases, which causes the surface areas of the very narrow passages of the particulate filter 29 to become physically smaller. The adjustment coefficient KADPF is designed to counteract the effects of the passages of the particulate filter 29 being smaller. Thus, although the change in the adjustment coefficient KADPF with respect to the temperature TMP_DPF is comparatively small as seen in FIG. 5, the adjustment coefficient KADPF generally becomes smaller as the temperature TMP_DPF increases. Accordingly, the equivalent surface area of the particulate filter 29 can be estimated with better precision by multiplying the reference value of the equivalent surface area by the adjustment coefficient KADPF in step S221.

In step S223, the control unit 5 is configured to compute a weighted average of the values of the equivalent surface area obtained in step S221 and output the result as an equivalent surface area ADPFD of the particulate filter 29.

Figure 6:
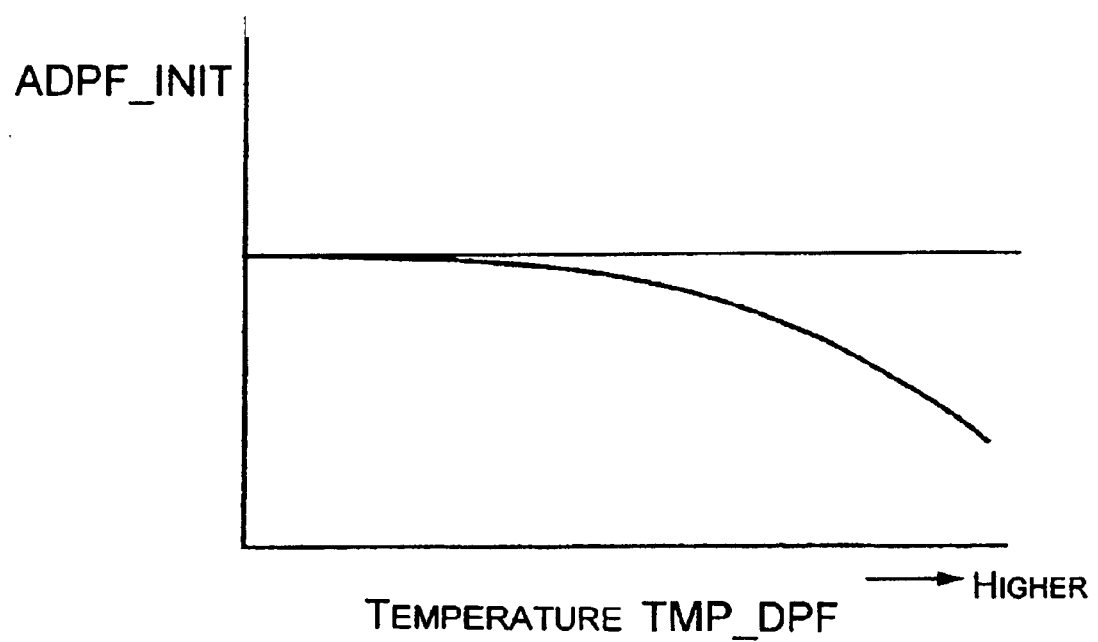
FIG. 6 is a characteristic diagram illustrating characteristics of a map TBL_ADPF_INIT used in step S225 in the functional block diagram of FIG. 3.

In step S225, the control unit 5 is configured and arranged to find an initial equivalent surface area ADPF_INIT of the particulate filter 29, which is an equivalent surface area for a hypothetical case in which absolutely no exhaust particulate matter are accumulated in the particulate filter 29. As explained above, the bulk density and, thus, the passage surface area of the particulate filter 29 changes as the temperature of the particulate filter 29 changes. Therefore, in this embodiment of the present invention, the control unit 5 is configured and arranged to adjust an equivalent surface area based on the temperature TMP_DPF by using a prescribed map TBL_ADPF_INIT to obtain the initial equivalent surface area ADPF_INIT. FIG. 6 illustrates the characteristic of the prescribed map TBL ADPF_INIT. As seen in FIG. 6, the initial equivalent surface area ADPF_INIT is substantially constant when the temperature is low, and decreases slightly when the temperature is high.

In step S226, the control unit 5 is configured and arranged to divide the equivalent surface area ADPFD obtained in step S223 by the initial equivalent surface area ADPF_INIT obtained in S225 to determine a passage surface area reduction ratio RTO_ADPF, i.e., a ratio of clogging ("clogging ratio") caused by the exhaust particulate matter accumulated in the particulate filter 29. In step S227, the control unit 5 is configured and arranged to refer to a prescribed map Th1_SPMact to determine the particulate matter accumulation amount (weight) SPMact based on the clogging ratio RTO_

ADPF. The prescribed map Tb1_SPMact is preferably set to follow a preset characteristic of the particulate matter accumulation amount SPMact with respect to the clogging ratio RTO_ADPF.

The particulate matter accumulation amount SPMact determined in step S227 as described above is then compared with a threshold value. If the particulate matter accumulation amount SPMact has reached the threshold value, the control unit 5 is configured and arranged to execute a mandatory regeneration of the particulate filter 29. The regeneration of the particulate filter 29 can be accomplished using any of various conventional methods. For example, the exhaust particulate matter accumulated in the particulate filter 29 can be combusted by closing the intake air throttle valve 41 so that the exhaust gas temperature is raised, or by executing a post fuel injection (an additional fuel injection executed after the main injection) so that the exhaust gas temperature is raised.

Moreover, in step S231, the control unit 5 is configured and arranged to determine a pressure rise amount resulting from an air flow resistance of the catalyst devices (i.e., the NOx trapping catalytic converter 28 and the oxidation catalytic converter 27) installed in the exhaust passage 2 upstream of the particulate filter 29 using a prescribed map TPEXH_CATS based on the exhaust gas flow rate QEXHD. The pressure rise amount basically increases as the exhaust gas flow rate QEXHD increases. In step S232, the control unit 5 is configured and arranged to add the output value PEXH_DPFIN of step S212 to the pressure rise amount obtained in step S231 to obtain an output value PEXH_TCOUT. The output value PEXH_TCOUT from step S231 is equivalent to the turbine outlet pressure in the exhaust passage 2 on the outlet side of the exhaust turbine 22 upstream of the oxidation catalytic converter 27.

Figure 7:
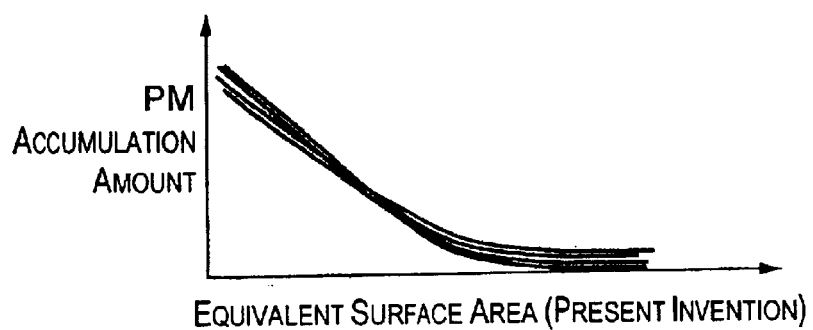
FIG. 7 is a diagram illustrating a relationship between an adjusted equivalent surface area and a particulate matter accumulation amount in accordance with the one embodiment of the present invention.
Figure 8:
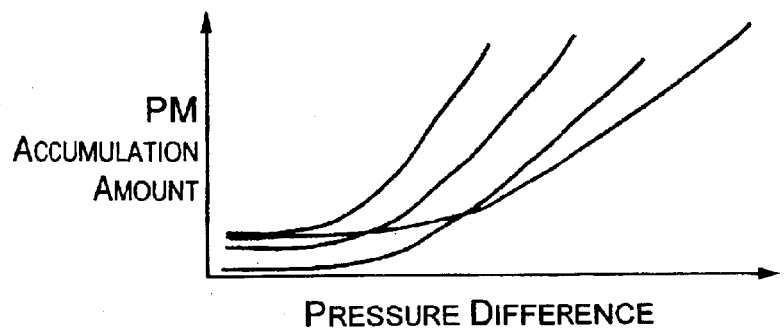
FIG. 8 is a diagram illustrating a relationship between a pressure difference between before and after the particulate filter.
Figure 9:
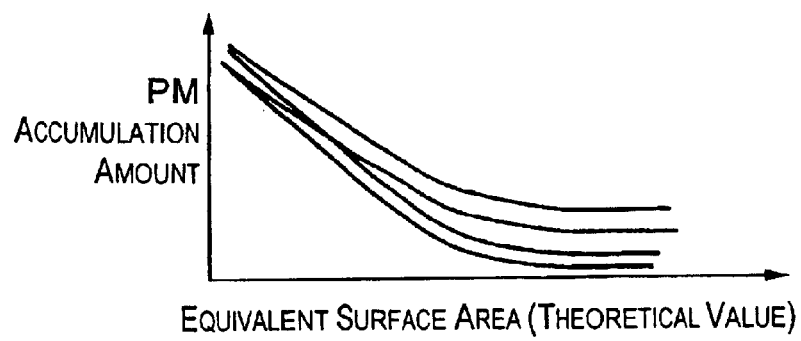
FIG. 9 is a diagram illustrating a relationship between a theoretical equivalent surface area and a particulate matter accumulation amount.

Accordingly, with the present invention, first the reference value (theoretical value) of the equivalent surface area of the particulate filter 29 is determined using a theoretical relationship based on the Bernoulli theorem. Then, the reference value is adjusted based on the exhaust gas pressure (which correlates to the exhaust gas flow rate QEXHD) and the temperature TMP_DPF of the particulate filter 29. As shown in FIG. 7, with the present invention, a substantially fixed correlation between the equivalent surface area and the particulate matter accumulation amount can be obtained in a stable manner regardless the engine operating conditions. As a result, erroneous determinations of the regeneration timing of the particulate filter 29 caused by changes in the engine operating conditions can be avoided and the particulate filter 29 can be regenerated at the appropriate timing with good repeatability.

The embodiment described above is explained using a particulate filter having a wall flow honeycomb structure as an example of the particulate filter 29. However, even when other types of filters are used, the passage surface area of a filter tends to physically expand as the exhaust gas pressure increases and the passage surface area tends to physically decrease due to increased bulk density as the filter temperature increases as explained above. Therefore, even when filters other than the wall flow honeycomb filter are used, the precision with which the particulate matter accumulation amount is estimated can be similarly improved by applying an adjustment in accordance with the present invention.

Moreover, in the embodiment explained above, the average of the exhaust gas temperatures at the inlet and outlet of the particulate filter 29 is used as the temperature of the particulate filter 29 as well as the temperature of the exhaust gas passing through the particulate filter 29. Of course, it will be apparent to those skilled in the art from this disclosure that the temperature of the particulate filter 29 can be detected directly using a separate temperature sensor for detecting the temperature of the particulate filter 29.

In the above explained embodiment, the control unit 5 preferably constitutes a pressure difference detecting section, an exhaust gas flow rate determining section, an exhaust gas temperature detecting section, an accumulation state determining section, and a regenerating section As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-284230. The entire disclosure of Japanese Patent Application No. 2003-284230 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust gas cleaning system comprising:

a particulate filter disposed in an exhaust passage of an engine configured and arranged to accumulate particulate matter in an exhaust gas discharged from the engine;

a pressure difference detecting section configured and arranged to detect a pressure difference in the exhaust passage between before and after the particulate filter;

an exhaust gas flow rate determining section configured and arranged to determine an exhaust gas flow rate;

an exhaust gas temperature detecting section configured and arranged to detect a temperature of the exhaust gas passing through the particulate filter; and an accumulation state determining section configured and arranged to determine an accumulation state of the particulate matter in the particulate filter by obtaining a reference equivalent surface area of a passage inside the particulate filter based on the pressure difference detected in the pressure difference detecting section, the exhaust gas flow rate determined in the exhaust gas flow rate determining section, and the temperature of the exhaust gas detected in the exhaust gas temperature detecting section, the accumulation state determining section being further configured to obtain an adjusted equivalent surface area by adjusting the reference equivalent surface area based on a temperature of the particulate filter and the exhaust gas flow rate.

2. The exhaust gas cleaning system as recited in claim 1, wherein
the particulate filter has a wall-flow honeycomb structure including a cylindrical filter material having a plurality of honeycomb-shaped fine channels that are blocked at alternate ends.

3. The exhaust gas cleaning system as recited in claim 1, wherein
the accumulation state determining section is further configured and arranged to determine an adjustment coefficient corresponding to the exhaust gas flow rate and the temperature of the particulate filter using a prescribed map, and to adjust the reference equivalent surface area by multiplying the reference equivalent surface area by the adjustment coefficient.

4. The exhaust gas cleaning system as recited in claim 3, wherein
the particulate filter has a wall-flow honeycomb structure including a cylindrical filter material having a plurality of honeycomb-shaped fine channels that are blocked at alternate ends.

5. The exhaust gas cleaning system as recited in claim 3, wherein
the accumulation state determining section further includes
an initial equivalent surface area determining section configured and arranged to obtain an initial equivalent surface area corresponding to an hypothetical equivalent surface area when an particulate matter accumulation amount is zero at the temperature of the particulate filter, and
an accumulation amount estimating section configured and arranged to obtain an estimated particulate matter accumulation amount by estimating an amount of particulate matter accumulated in the particulate filter based on a ratio of the adjusted equivalent surface area and the initial equivalent surface area.

6. The exhaust gas cleaning system as recited in claim 5, further comprising
a regenerating section configured and arranged to regenerate the particulate filter when the estimated particulate matter accumulation amount becomes equal to or greater than a prescribed value.

7. The exhaust gas cleaning system as recited in claim 1, wherein
the accumulation state determining section further includes
an initial equivalent surface area determining section configured and arranged to obtain an initial equivalent surface area corresponding to an hypothetical equivalent surface area when an particulate matter accumulation amount is zero at the temperature of the particulate filter, and
an accumulation amount estimating section configured and arranged to obtain an estimated particulate matter accumulation amount by estimating an amount of particulate matter accumulated in the particulate filter based on a ratio of the adjusted equivalent surface area and the initial equivalent surface area.

8. The exhaust gas cleaning system as recited in claim 7, further comprising
a regenerating section configured and arranged to regenerate the particulate filter when the estimated particulate matter accumulation amount becomes equal to or greater than a prescribed value.

9. The exhaust gas cleaning system as recited in claim 7, wherein
the particulate filter has a wall-flow honeycomb structure including a cylindrical filter material having a plurality of honeycomb-shaped fine channels that are blocked at alternate ends.

10. A particulate matter accumulation state determining method for an engine exhaust cleaning system comprising:
determining an exhaust gas flow rate based on a fresh intake air flow rate and a fuel injection amount of the engine;
determining an exhaust gas pressure in a vicinity of an inlet of a particulate filter disposed in an exhaust passage based on the exhaust gas flow rate and a pressure difference in the exhaust passage between before and after the particulate filter;
determining an exhaust gas density based on the exhaust gas pressure and a temperature of the particulate filter;
determining a reference equivalent surface area of the particulate filter based on the exhaust gas flow rate and the exhaust gas density;
determining an adjustment coefficient based on the temperature of the particulate filter and the exhaust gas flow rate; and
determining an equivalent surface area of the particulate filter by multiplying the reference equivalent surface area by the adjustment coefficient.

11. An exhaust gas cleaning system comprising:
particulate matter accumulating means for accumulating particulate matter in an exhaust gas discharged from the engine;
pressure difference detecting means for detecting a pressure difference in an exhaust passage between before and after the particulate matter accumulating means;
exhaust gas flow rate determining means for determining an exhaust gas flow rate;
exhaust gas temperature detecting means for detecting a temperature of the exhaust gas passing through the particulate matter accumulating means; and
accumulation state determining means for determining an accumulation state of the particulate matter in the particulate matter accumulating means by obtaining a reference equivalent surface area of a passage inside the particulate matter accumulating means based on the pressure difference detected in the pressure difference detecting means, the exhaust gas flow rate determined in the exhaust gas flow rate determining means, and the exhaust gas temperature detected in the exhaust gas temperature detecting means, the accumulation state determining means being further configured to obtain an adjusted equivalent surface area by adjusting the reference equivalent surface area based on a temperature of the particulate matter accumulating means and the exhaust gas flow rate.

* * * * *